United States Patent
Collotta et al.

(10) Patent No.: US 10,411,818 B2
(45) Date of Patent: Sep. 10, 2019

(54) SIGNAL TO INTERFERENCE AND NOISE RATIO ESTIMATION

(71) Applicant: TELECOM ITALIA S.p.A., Milan (IT)

(72) Inventors: Ivano Collotta, Turin (IT); Roberto Fantini, Turin (IT); Maurizio Fodrini, Turin (IT); Bruno Melis, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 15/778,820

(22) PCT Filed: Nov. 30, 2015

(86) PCT No.: PCT/EP2015/078037
§ 371 (c)(1),
(2) Date: May 24, 2018

(87) PCT Pub. No.: WO2017/092783
PCT Pub. Date: Jun. 8, 2017

(65) Prior Publication Data
US 2018/0359038 A1    Dec. 13, 2018

(51) Int. Cl.
*H04L 25/02* (2006.01)
*H04B 17/336* (2015.01)
(Continued)

(52) U.S. Cl.
CPC ......... *H04B 17/336* (2015.01); *H04B 17/327* (2015.01); *H04L 25/024* (2013.01); *H04W 52/241* (2013.01)

(58) Field of Classification Search
CPC ... H04B 17/336; H04B 17/327; H04L 25/024; H04W 52/241
See application file for complete search history.

(56) References Cited

U.S. PATENT DOCUMENTS 6,249,518 B1 * 6/2001 Cui .................. H04B 7/005
                                                  370/201
6,292,519 B1    9/2001 Popovic
(Continued)

FOREIGN PATENT DOCUMENTS

EP    0 969 604 A2    1/2000
WO    WO 99/46869 A1   9/1999
(Continued)

OTHER PUBLICATIONS

International Search Report dated Aug. 19, 2016 in PCT/EP2015/078037 filed Nov. 30, 2015.
(Continued)

*Primary Examiner* — Jay P Patel
(74) *Attorney, Agent, or Firm* — Oblon, McClelland, Maier & Neustadt, L.L.P.

(57) ABSTRACT

A method for estimating a signal to interference and noise ratio of a communication link between a first node and a second node of a wireless communication network, the network comprising a number of further communication links between said first node and a number of further nodes. The method comprises, at the first node, providing first estimates of useful signal powers on all the links; providing second estimates of the signal powers on the link and on the further communication links on the basis of, jointly, the first estimate of the signal power on the link and the first estimates of the signal powers on the further links; estimating the signal to interference and noise ratio as a ratio between the second estimate of the signal power on the link and a power term comprising a sum of the second estimates of the signal powers on the further links.

15 Claims, 3 Drawing Sheets

(51) Int. Cl.
*H04W 52/24* (2009.01)
*H04B 17/327* (2015.01)

(56) References Cited

U.S. PATENT DOCUMENTS

| | | | |
|---|---|---|---|
| 6,404,826 B1 | 6/2002 | Schmidl et al. | |
| 6,426,971 B1* | 7/2002 | Wu | H04B 1/1027 375/227 |
| 6,778,612 B1* | 8/2004 | Lozano | H04B 7/0626 375/299 |
| 7,317,751 B2* | 1/2008 | Kyosti | H04B 17/336 375/148 |
| 2003/0035468 A1* | 2/2003 | Corbaton | H04B 1/712 375/148 |
| 2004/0131108 A1* | 7/2004 | Kyosti | H04B 17/336 375/148 |
| 2006/0210001 A1* | 9/2006 | Li | H04W 52/243 375/346 |
| 2007/0072552 A1 | 3/2007 | Jonsson et al. | |
| 2007/0258547 A1* | 11/2007 | Montalbano | H04B 17/336 375/343 |
| 2008/0273624 A1* | 11/2008 | Kent | H04B 7/0632 375/296 |
| 2010/0009705 A1* | 1/2010 | Budianu | H04L 1/1812 455/501 |
| 2010/0284500 A1 | 11/2010 | Luschi et al. | |
| 2012/0258763 A1* | 10/2012 | Bjorkegren | H04W 52/12 455/522 |
| 2013/0072205 A1* | 3/2013 | Wang | H04L 1/0019 455/450 |

FOREIGN PATENT DOCUMENTS

| | | |
|---|---|---|
| WO | WO 02/087106 A1 | 10/2002 |
| WO | WO 2004/051902 A1 | 6/2004 |
| WO | WO 2009/077337 A2 | 6/2009 |
| WO | WO 2004/102824 A1 | 11/2014 |

OTHER PUBLICATIONS

T. Hastie et al., "The Elements of Statistical Learning", Springer Series in Statistics, Second Edition, Feb. 2009, 5 total pages.

* cited by examiner

SIGNAL TO INTERFERENCE AND NOISE RATIO ESTIMATION

TECHNICAL FIELD

The present invention relates to the field of wireless communication networks. In particular, the present invention relates to a method and an apparatus for estimating the signal to interference and noise ratio (SINR) of a communication link of a wireless communication network.

BACKGROUND ART

In a wireless communication network, when a frequency band is shared for transmission by multiple users, interference may arise on the signal of one user due to the presence of the signals of the other users. In this case, the quality of the signal of a user may be strongly degraded. An example of a wireless network potentially affected by the problem above is a UMTS (Universal Mobile Telecommunications System) network employing the W-CDMA (Wideband Code Division Multiple Access) technology. In particular, in a W-CDMA access network, a base station receives signals from a number of near and far mobile stations. If all the mobile stations transmit at the same power level, signals from near mobile stations will be received by the base station at high power level, while signals from remote mobile stations will have a much lower power level. Communication from far mobile stations will be strongly impaired by the interference generated by near mobile stations. This effect is commonly known as the "near-far problem".

Typically, in a UMTS network, a technique known as transmission power control is applied. This technique allows controlling the transmission power of the mobile stations on the uplink such that the received power levels at the base station from near and far mobile stations allow to achieve target values of the signal to interference and noise ratio (SINR) for the communication links established between the mobile stations and the base station, regardless of the position of the mobile stations.

Moreover, as known, received power at a base station fluctuates rapidly due to small scale fading effects in the communication links. Therefore, a closed loop transmission power control system is typically used, which employs transmission power control bits to set the transmitted power at a mobile station on the basis of the received SINR. In particular, when a mobile station in a cell communicates with the corresponding base station, the base station estimates the received SINR of the communication link, compares the received SINR with the target SINR set for the communication link, and determines the transmission power control bits accordingly. Subsequently, the base station sends the transmission power control bits through a feedback channel to the mobile station. Upon reception of the feedback signal from the base station, the mobile station extracts the transmission power control bits and determines the transmission power. The closed loop thus formed between the base station and the mobile station enables to adjust the transmission power in order to keep the received SINR constant at the target level even in presence of the small scale fading effects mentioned above.

Several techniques for estimating the SINR at a base station are known.

WO 02/087106 A1 discloses a method and a device for estimating the signal to interference ratio of a signal, in particular in a base station of a WCDMA system, providing at least a first estimating process and a second estimating process, wherein for current use with the signal a selection among said estimating processes is made in accordance with a current characteristic or current characteristics of said signal so that an estimating process is selected which is most suitable in view of the current characteristic(s) of said signal.

According to WO 02/087106 A1, a known method for estimating the SIR (signal to interference ratio) may be described as follows. According to this method, the SIR is estimated by using a narrowband interference estimation. The signal to interference ratio is described by:

$$SIR = \frac{S}{I} \quad [1]$$

where S is the received signal power of a dedicated physical control channel (DPCCH) and I is the interference power including a system thermal noise. Equation [1] requires the estimation of the signal power and the interference power. The signal power can be estimated using the pilot symbols in the DPCCH channel separately for each receiving antenna as:

$$S' = \sum_{k=1}^{L} S'_k = \sum_{k=1}^{L} \left| \frac{1}{N_p} \sum_{i=1}^{N_p} z_{k,i} \right|^2 \quad [2]$$

where L is the number of allocated fingers for current antenna (number of received paths), $N_p$ is the number of pilot symbols, and z is the sample (complex value) of the DPCCH channel, from which the pilot modulation is removed.

The signal power estimate is biased by the second term in the following equation:

$$E(S') = S + \frac{I \cdot L}{N_p}. \quad [3]$$

The bias can be removed after the antennawise noise and interference power I is estimated, with the following equation:

$$S'_{ub} = S' - \frac{I \cdot L}{N_p}. \quad [4]$$

The power of the noise and interference term I is determined considering that, under the assumption that the power of the transmitted narrowband signal and the channel power remain constant over the calculation period (i.e. a timeslot), the variance of the received signal is equal to the variance of the noise and interference. The interference power estimate is given by:

$$I' = \frac{1}{L} \sum_{k=1}^{L} I'_k \quad [5]$$

where:

$$I'_k = \frac{1}{N_P}\sum_{i=1}^{N_P} z_{k,i} \cdot z^*_{k,i} - \left|\frac{1}{N_P}\sum_{i01}^{N_P} z_{k,i}\right|^2 \quad [6]$$

where $z_{k,i}^*$ is the complex conjugate of the despread and demodulated pilot symbol $z_{k,i}$.

To reduce the variance of the interference and noise power estimate of a current antenna, the estimate can be filtered using a 1-tap IIR filter, resulting in the following equation:

$$I'_{fil}(t) = k \cdot I'(t) + (1-k) \cdot I'(t-1) \quad [7]$$

Where index t refers to a current timeslot and (t−1) to a previous timeslot. The Kalman gain k of the filter should be 0.25.

Using equations [4] and [7] in equation [1], the SIR of one antenna may be estimated as:

$$SIR' = \frac{S'_{ub}}{I'_{fil}} = \frac{S' - \frac{I'_{fil} \cdot L}{N_P}}{I'_{fil}}. \quad [8]$$

U.S. Pat. No. 6,404,826 B1 discloses a circuit designed with an estimate circuit coupled to receive a plurality of predetermined signals from an external source. Each of the predetermined signals is spaced apart in time. The estimate circuit produces a first estimate signal in response to at least one of the plurality of predetermined signals. An averaging circuit is coupled to receive a data signal and at least one of the plurality of predetermined signals. The averaging circuit produces an average signal from the data signal and at least one of the plurality of predetermined signals.

WO 99/46869 discloses using measured estimates of received signal energy and interference values to determine a measured signal-to-interference ratio (SIR) value. The measured SIR value is corrected for non-linearity to obtain a corrected SIR value using a correction function. That corrected SIR value may then be used in any number of applications such as to control the transmit power of mobiles in a mobile radio communications system.

WO 2004/051902 discloses a method for providing an unbiased signal-to-interference (SIR) estimation in a radio communication system. The method comprises the steps of receiving a transmitted signal, estimating the signal energy and an interference value of the received signal, calculating a first SIR estimate based on the estimated signal energy and the interference value, correcting the first estimated SIR-value for nonlinearity by means of a correction function and thereby obtaining a corrected SIR-value, while taking inter-path interference into account, repeatedly calculating the corrected SIR-value on the basis of received signal samples, whereby the same accuracy is achieved regardless of the number of paths occurring in the receiver.

SUMMARY OF THE INVENTION

The Applicant has tackled the problem of providing a method for estimating the SINR of a communication link of a wireless communication network that allows improving the accuracy of the SINR estimation provided by known methods. In particular, the Applicant has tackled the problem of providing a method for estimating the SINR of a communication link at a base station of a wireless communication network which allows improving the accuracy of the SINR estimation with respect to known methods, especially in situations that are particularly critical, such as in situations wherein interference is very high or, on the other hand, situations wherein the SINR is very high.

According to a first aspect, the present invention provides a method for estimating the signal to interference and noise ratio of a communication link between a first node and a second node of a wireless communication network, the network comprising a number of further communication links between the first node and a number of further nodes of the wireless communication network, the method comprising, at the first node:

a) providing first estimates of useful signal powers on the communication link and on the further communication links;

b) providing second estimates of the useful signal powers on the communication link and on the further communication links on the basis of, jointly, the first estimate of the useful signal power on the communication link and the first estimates of the useful signal powers on the further communication links;

c) estimating the signal to interference and noise ratio as a ratio between the second estimate of the useful signal power on the communication link and a power term comprising a sum of the second estimates of the useful signal powers on the further communication links.

According to an embodiment of the present invention, providing a second estimate of the useful signal power on the communication link comprises providing a minimum square error in turn comprising a first error between said second estimate of the useful signal power on said communication link and said first estimate of the useful signal power on said communication link.

Preferably, the minimum square error comprises a second error between a first estimate of an interference power on the communication link and the power term comprising a sum of the second estimates of the useful signal powers on the further communication links.

Preferably, the minimum square error comprises a third error between an estimate of an overall power received by the first node on the communication link and the further communication links and an even further power term comprising a sum of the second estimate of the useful signal power on the communication link and the second estimates of the useful signal powers on the further communication links.

According to another embodiment of the present invention, each of the first error, second error and third error is weighted by a respective weight.

Preferably, the weight for the first error is equal to the first estimate of the useful signal power on the communication link, the weight for the second error is equal to the first estimate of the interference power on the communication link and the weight for the third error is equal to the estimate of the overall power.

Preferably, providing a minimum square error is performed by applying a linear least square method.

Preferably, the power term in the second error is scaled by a scale factor. The scale factor may be a spreading factor of an UMTS receiver or a processing gain of an LTE receiver.

Preferably, the power term comprises an estimate of a noise power plus residual interference comprising thermal noise.

Preferably, the first estimate of the useful signal power on the communication link and the first estimates of the useful signal powers on the further communication links are provided by applying a SIR estimation method with narrow-band interference estimate.

According to a second aspect, the present invention provides a computer program product loadable in the memory of a computer and including software code portions for performing the steps of the method as set forth above, when the program is run on the computer.

According to a third aspect, the present invention provides a device for estimating a signal to interference and noise ratio of a communication link between a first node and a second node of a wireless communication network, the network comprising a number of further communication links between the first node and a number of further nodes of the wireless communication network, the device comprising:

a number of power estimating modules configured to provide first estimates of the useful signal powers on the communication link and on the further communication links;

a computing module configured to provide second estimates of the useful signal powers on the communication link and on the further communication links on the basis of, jointly, the first estimate of the useful signal power on the communication link and the first estimates of the useful signal powers on the further communication links, and to estimate the signal to interference and noise ratio as a ratio between the second estimate of the useful signal power on the communication link and a power term comprising a sum of the second estimates of the useful signal powers on the further communication links.

According to a fourth aspect, the present invention provides a power control unit for a receiver of a node of a wireless communication network comprising a device for estimating a signal to interference and noise ratio as set forth above.

According to a fifth aspect, the present invention provides a receiver for a node of a wireless communication network comprising a device for estimating a signal to interference and noise ratio as set forth above.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
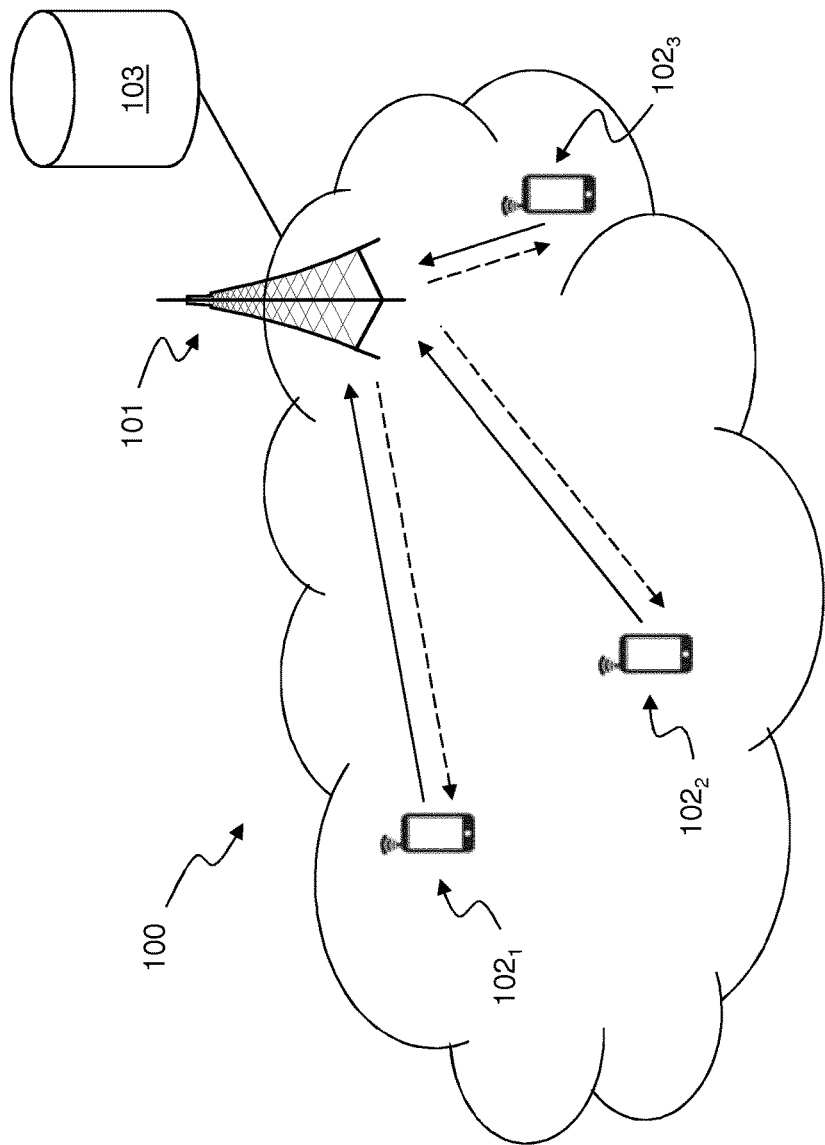
FIG. 1 schematically shows an exemplary wireless communication network.

FIG. 1 schematically shows an exemplary wireless communication network 100 in which the method according to the present invention may be used.

The wireless communication network 100 is preferably a radio access communication network. For instance, the wireless communication network 100 may be a UMTS radio access network (UTRAN) or a LTE (Long Term Evolution) radio access network (E-UTRAN).

The wireless communication network 100 comprises a first node 101 and a number N of second nodes $102_i$, $i=1, \ldots, N$ connected to the first node 101 by means of respective bidirectional wireless communication links. For sake of not limiting example, in FIG. 1, the first node 101 is a base station, and the number N of second nodes $102_i$, $i=1, \ldots, N$ are mobile stations within a coverage area (or, cell) of the base station 101. N is an integer number greater than or equal to 1. For sake of example, the wireless communication network 100 of FIG. 1 comprises three mobile stations $102_1$, $102_2$, $102_3$. The base station 101 may be a NodeB of a UTRAN or an eNodeB of a E-UTRAN.

Each mobile station $102_1$, $102_2$, $102_3$ is connected to the base station 101 by means of a respective bidirectional wireless communication link, comprising an uplink (represented by a continuous arrow in FIG. 1), allowing transmission of data over a radio signal from the mobile station $102_1$, $102_2$, $102_3$ to the base station 101, and a downlink (represented by a dashed arrow in FIG. 1) allowing transmission of data over a radio signal from the base station 101 to the mobile station $102_1$, $102_2$, $102_3$.

The radio signal carrying data from a mobile station to the base station will be referred to in the following description and in the claims as useful signal of the mobile station.

The wireless communication network 100 further comprises a controller 103 which is connected to the base station 101. The controller 103 may be a radio network controller (RNC) of a UTRAN.

Assuming that the wireless communication network 100 implements a known power control technique, the controller 103 checks an error rate of each communication link and sets a respective target SINR for each communication link. The controller 103 then informs the base station 101 about the target SINRs of the communication links served by the base station. The base station 101 evaluates the actual values of the SINRs on the communications links according to the method of the present invention, and compares these actual values of the SINRs with the target values of the SINRs. On the basis of the result of the comparison, the base station 101 informs each mobile station $102_1$, $102_2$, $102_3$ to lower or to increase the respective transmission power by means of transmission power control commands $C_1$, $C_2$, $C_3$.

Figure 2:
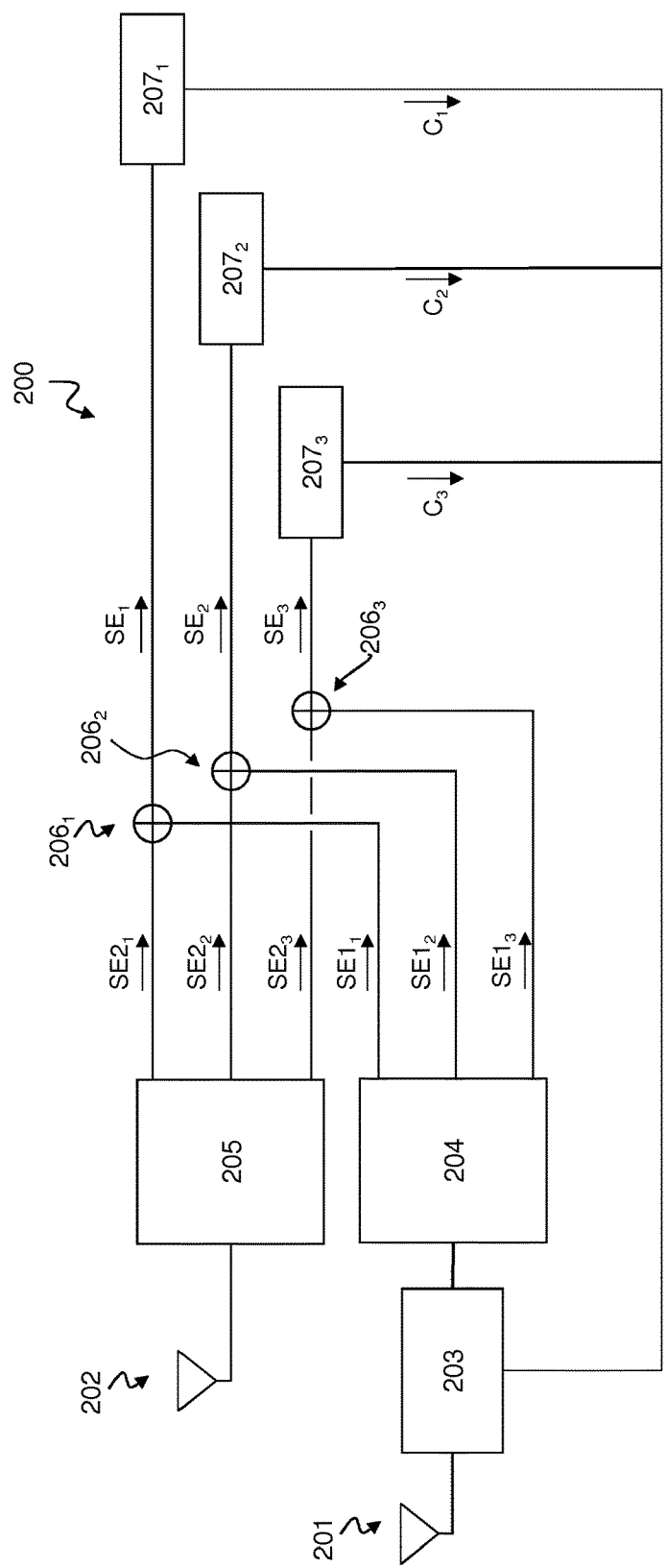
FIG. 2 is a block scheme of a transmission power control unit comprised within a base station of the wireless communication network.

FIG. 2 shows a block scheme of a power control unit 200 of a receiver of the base station 101 configured to implement the power control technique described above. The operation of a power control unit is known in the art and accordingly it will only be briefly described herein after for sake of completeness.

It is assumed, for sake of example, that the receiver of the base station 101 comprises one or more antenna, for instance a first antenna 201 and a second antenna 202. According to this example, the first antenna 201 is used for both transmission and reception of signals to/from the mobile stations $102_1$, $102_2$, $102_3$ and for transmission of power control commands to the mobile stations $102_1$, $102_2$, $102_3$. The second antenna 202 is used for reception of signals from the mobile stations $102_1$, $102_2$, $102_3$. The base station 101 further comprises a duplexer 203 connected to the first antenna 201 to separate the signals received from the mobile stations $102_1$, $102_2$, $102_3$ from the power control commands $C_1$, $C_2$, $C_3$. that are to be transmitted from the first antenna 201. The presence of the two antennas and the duplexer at the base station is merely exemplary, as the method of the present invention may be applied also when different antenna configurations are employed.

The power control unit 200 comprises a first SINR estimating device 204 connected to the first antenna 201 through the duplexer 203 and a second SINR estimating device 205 connected to the second antenna 202. Each SINR estimating device 204, 205 is preferably configured to provide estimates of the SINRs for the communication links served by the base station 101 and connecting the base station 101 to respective mobile stations $102_1$, $102_2$, $102_3$, according to the method of the present invention. The operation of each SINR estimating device 204, 205 will be described in detail herein after.

Each SINR estimating device 204, 205 has a number of outputs equal to the number N of communication links served by the base station 101, each output being connected to a respective adder $206_1$, $206_2$, $206_3$ and providing a respective SINR estimate. The SINR estimates provided by the first SINR estimating device 204 are indicated in FIG. 2 as $SE1_1$, $SE1_2$, $SE1_3$, while the SINR estimates provided by the second SINR estimating device 205 are indicated in FIG. 2 as $SE2_1$, $SE2_2$, $SE2_3$. The number of adders $206_1$, $206_2$, $206_3$ is equal to the number N of communication links served by the base station 101. Therefore, the block scheme of FIG. 2 comprises three adders $206_1$, $206_2$, $206_3$. Each adder $206_1$, $206_2$, $206_3$ is preferably configured to sum the two estimates of the SINR related to a respective communication link and provided by the first SINR estimating device 204 and the second SINR estimating device 205. The SINR estimates provided by the adders $206_1$, $206_2$, $206_3$ are indicated in FIG. 2 as $SE_1$, $SE_2$, $SE_3$ respectively. The output of each adder $206_1$, $206_2$, $206_3$ is then connected to a respective control module $207_1$, $207_2$, $207_3$ that is configured to compare the estimate $SE_1$, $SE_2$, $SE_3$ of the SINR provided by the adder $206_1$, $206_2$, $206_3$ with the target SINR for the respective communication link and to generate a respective power control command $C_1$, $C_2$, $C_3$ on the basis of the result of the comparison. In particular, if the estimate of the SINR is higher than the target SINR, the control module $207_1$, $207_2$, $207_3$ generates a command $C_1$, $C_2$, $C_3$ instructing the mobile station to reduce its transmission power, while, if the estimate of the SINR is lower than the target SINR, the control module $207_1$, $207_2$, $207_3$ generates a command $C_1$, $C_2$, $C_3$ instructing the mobile station to increase its transmission power.

The power control commands $C_1$, $C_2$, $C_3$ are then transmitted to the mobile stations $102_1$, $102_2$, $102_3$ through the duplexer 203 and the first antenna 201.

The power control unit 200 may comprise other modules and components that are not shown in FIG. 2 as they are not relevant to the present description. In particular, for instance, in case the base station 101 is a NodeB of an UMTS radio access network, other modules may be interposed between the antennas and the power control unit at the receiver of the NodeB, such as modules performing the decoding and de-spreading operations. In case the base station 101 is an eNodeB of an LTE radio access network, the receiver may comprise a module performing a decoding operation interposed between the antennas and the power control unit.

The components 204, 205, 206 and 207 of the power control unit 200 shown in FIG. 2 and described here above are preferably implemented as software modules running over a dedicated hardware.

Figure 3:
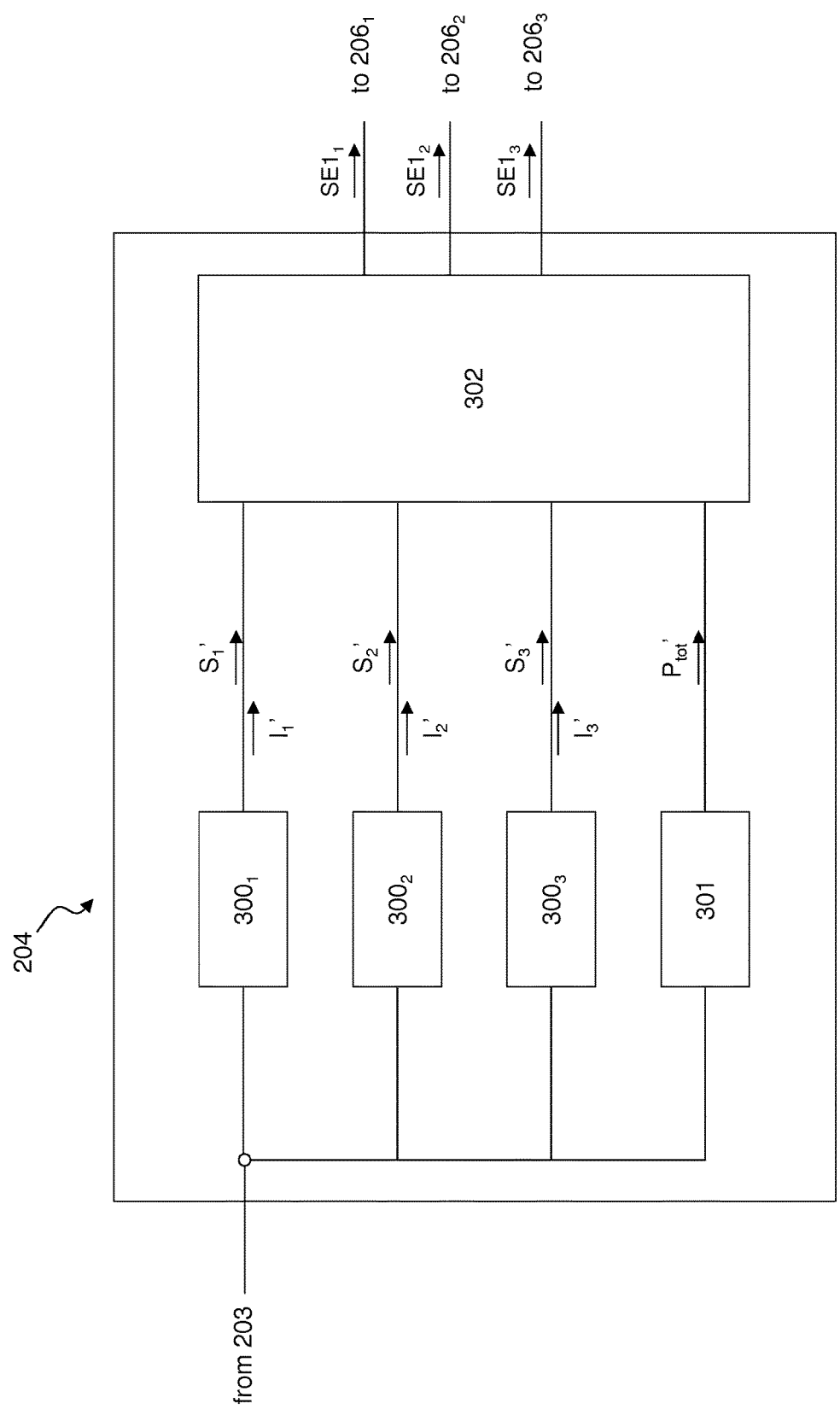
FIG. 3 is a block scheme of a SINR estimating device according to the present invention, comprised within the transmission power control unit of the base station.

In the following description, the operation of the first SINR estimating device 204 and the second SINR estimating device 205 of FIG. 2, according to the present invention, will be described in greater detail. The operation of the two SINR estimating devices 204, 205 is the same, hence, in the following description, reference will be made only to one of them, in particular the first SINR estimating device 204, which will be indicated simply as "SINR estimating device". FIG. 3 shows a block scheme of the SINR estimating device 204.

The SINR estimating device 204 preferably comprises a number N of first power estimating modules $300_1$, $300_2$, $300_3$, each first power estimating module being configured to process the signals received by the first antenna 201 and to estimate a respective useful signal power $S_1'$, $S_2'$, $S_3'$ received from a corresponding mobile station $102_1$, $102_2$, $102_3$. Each first power estimating module $300_1$, $300_2$, $300_3$ is further configured to estimate a respective interference power $I_1'$, $I_2'$, $I_3'$ related to the corresponding mobile station $102_1$, $102_2$, $102_3$. The estimated interference power includes also a system thermal noise of the system components. The useful signal powers $S_1'$, $S_2'$, $S_3'$ estimated by the first power estimating modules $300_1$, $300_2$, $300_3$ will be referred to herein after as "first estimates of the useful signal powers", and the interference powers $I_1'$, $I_2'$, $I_3'$ estimated by the first power estimating modules $300_1$, $300_2$, $300_3$ will be referred to herein after as "first estimates of the interference powers". According to the example described above and represented in the Figures, the SINR estimating device 204 of FIG. 3 comprises three first power estimating modules $300_1$, $300_2$, $300_3$ configured to process the signals received from the three mobile stations $102_1$, $102_2$, $102_3$ of FIG. 1, respectively.

Each first power estimating module $300_1$, $300_2$, $300_3$ is preferably configured to provide a respective first estimate of a useful signal power $S_1'$, $S_2'$, $S_3'$ and a respective first estimate of an interference plus noise power $I_1'$, $I_2'$, $I_3'$ by implementing a known method, such as, for instance, the method disclosed in WO 02/087106 A1 (as reported above, see equations [1] to [8]). Alternatively to the method described in WO 02/087106 A1, the method described in WO 2004/051902 A1 (in particular, equations [3] to [5] of WO 2004/051902 A1) may be used for providing the first estimates of the useful signal power $S_1'$, $S_2'$, $S_3'$ and the first estimates of the interference plus noise power $I_1'$, $I_2'$, $I_3'$.

The SINR estimating device 204 preferably further comprises a second power estimating module 301, which is configured to process the signals received by the first antenna 201 and to estimate a total power $P_{tot}'$ received by the base station 101 on the served communication links.

Preferably, the first power estimating modules $300_1$, $300_2$, $300_3$ and the second power estimating module 301 operate in parallel.

The SINR estimating device 204 preferably further comprises a computing module 302 having a number of inputs connected to the outputs of the first power estimating modules $300_1$, $300_2$, $300_3$ and the second power estimating module 301. The computing module 302 is preferably configured to provide a number N of SINR estimates for the communication links served by the base station 101 on the basis of the first estimates of the useful signal powers $S_1'$, $S_2'$, $S_3'$, the first estimates of the interference powers $I_1'$, $I_2'$, $I_3'$ and the estimate of the total power $P_{tot}'$ provided by the first power estimating module $300_1$, $300_2$, $300_3$ and the second power estimating module 301, respectively, as it will be described herein after.

In particular, according to a first embodiment of the present invention, the computing module 302 is preferably configured to provide a number N of second estimates of the useful signal powers $S_i$, i=1, . . . , N, and an estimate of a noise power plus residual interference $N_0$ (that represents thermal noise and residual interference coming from mobile stations in other cells) by solving the following equations:

$$\begin{cases} S_i = S'_i + e_i & i = 1, \ldots, N \\ \dfrac{1}{G}\left(\sum_{j=1, j\neq i}^{N} S_j + N_0\right) = I'_i + e_{N+i} & i = 1, \ldots, N \\ \sum_{j=1}^{N} S_j + N_0 = P'_{tot} + e_{2N+1} \end{cases} \quad [9]$$

where $S'_i$, $i=1, \ldots, N$ are the first estimates of the useful signal powers, $I'_i$, $i=1, \ldots, N$ are the first estimates of the interference powers, $P'_{tot}$ is the total power, $e_i$, $i=1, \ldots, N$ are residual errors affecting the second estimates of the useful signal powers, $e_{N+i}$, $i=1, \ldots, N$ are residual errors affecting the second estimates of the interference powers, $e_{2N+1}$ is a residual error affecting the estimate of the noise power plus residual interference $N_0$, and G is a scale factor. The scale factor G is preferably a numerical factor whose amount is indicative of a ratio between a data rate of the received useful signal and a rate of the original data. It depends on the processing operations undergone by the received useful signal at the receiver in order to recover the original data.

In case the wireless communication network 100 is a UMTS radio access network, the scale factor G may be the spreading factor of the UMTS receiver at the NodeB 101. In particular, the scale factor G may be the spreading factor used for the DPCCH channel that carries the pilot symbols used for providing the first estimates of the useful signal powers $S'_i$, $i=1, \ldots, N$ according to WO 02/087106 A1, as described above. The value of the spreading factor may be in this case equal to, e.g., 256. In case the wireless communication network 100 is a LTE radio access network, the scale factor G may be the processing gain of the LTE receiver at the eNodeB 101.

It is to be noticed that according to the second equation in [9], the interference power $I_i$ affecting the i-th communication link served by the base station 101 with the mobile station 102$_i$ depends on the power of the useful signals from the other mobile stations 102$_j$, $j=1, \ldots, N$, where $j\neq i$, plus the noise power plus residual interference $N_0$. The summation of the above terms is scaled down by the scale factor G.

Equations [9] can be written in matrix form as:

$$\overline{A}\overline{X} = \overline{Y} + \overline{e} \quad [10]$$

where $\overline{A}$ is a matrix comprising zeros and ones, vector $\overline{X}$ comprises the second estimates of the useful signal powers and the estimate of the noise power plus residual interference, vector $\overline{Y}$ comprises the first estimates of the useful signal powers, the first estimates of the interference powers multiplied by the scale factor and the estimated total power, and vector $\overline{e}$ comprises the residual errors. In particular, vectors $\overline{X}$, $\overline{Y}$, $\overline{e}$ are defined as follows:

$$\overline{X} = [S_1, S_2, \ldots, S_N, N_0]' \quad [11]$$

$$\overline{Y} = [S'_1, S'_2, \ldots, S'_N, G \cdot I'_1, \ldots, G \cdot I'_N, P'_{tot}]' \quad [12]$$

$$\overline{e} = [e_1, e_2, \ldots, e_N, G \cdot e_{N+1}, \ldots, G \cdot e_{2N}, e_{2N+1}]'. \quad [13]$$

For example, if N=3, matrix $\overline{A}$ is the following:

$$\overline{A} = \begin{bmatrix} 1 & 0 & 0 & 0 \\ 0 & 1 & 0 & 0 \\ 0 & 0 & 1 & 0 \\ 0 & 1 & 1 & 1 \\ 1 & 0 & 1 & 1 \\ 1 & 1 & 0 & 1 \\ 1 & 1 & 1 & 1 \end{bmatrix}. \quad [14]$$

The computing module 302 is preferably configured to use the first estimates (of both the useful signal powers and the interference powers) comprised in vector $\overline{Y}$ to solve the matrix equation [10] and find vector $\overline{X}$. In particular, the computing module 302 is preferably configured to solve matrix equation [10] by searching for the vector $\overline{X}$ that provides a minimum square error $|\overline{e}|^2$. More in particular the computing module 302 is preferably configured to solve the following minimization problem:

$$\min_{\overline{X}} |\overline{e}|^2 = \min_{\overline{X}} |\overline{A}\overline{X} - \overline{Y}|^2 \quad [15]$$

where $\overline{X}$ is the vector of unknowns (i.e. the second estimates of the useful signal powers and the noise power plus residual interference), $\overline{Y}$ comprises known values (i.e. the first estimates of the useful signal powers and interference powers scaled up by the scale factor, and the estimate of the total power) and $\overline{A}$ is the matrix described above.

The minimization problem [15] is preferably solved by the computing module 302 by applying a known method such as the linear least square (LLS) method, as described in "The Elements of Statistical Learning" by Trevor Hastie, Robert Tibshirani, Jerome Friedman, Second Edition, pages 11-12, Springer, February 2009.

As reported in the reference book above (see equation 2.6 of page 12), the solution is given by vector $\overline{X} = [S_1, S_2, \ldots, S_N, N_0]'$ computed as follows:

$$\overline{X} = (\overline{A}^T \overline{A})^{-1} \overline{A}^T \overline{Y} \quad [16]$$

where, as known, apex T indicates the transpose of a matrix.

The computing module 302 is further preferably configured to check this solution for negative values, which, as known, may arise when solving a minimum square error problem. Being the variables in $\overline{X}$ power levels, negative values have no physical meaning. In case a negative value is found, the computing module 302 is preferably configured to discard it and substitute it either with a zero value or the value of the corresponding first estimate.

Finally, the computing module 302 is configured to compute an estimate $SE_i$, $i=1, \ldots, N$ of the SINR for each communication link by applying the following equation:

$$SE_i = \dfrac{S_i}{\sum_{j=1, j\neq i}^{N} S_j + N_0}. \quad [17]$$

The inventors noticed that the term $(\overline{A}^T \overline{A})^{-1} \overline{A}^T$ in equation [16] depends on the number N of communication links served by the base station 101. According to the present invention, this term may be computed by the computing module 302 every time the number of communication links served by the base station is updated and its current value may be stored within the SINR estimating device(s) 204, 205. In this way, each time the SINR estimating device 204, 205 is operated to provide SINR estimates for, e.g., implementing a power control mechanism as described above, the computing module 302 may recover the current value of $(\overline{A}^T \overline{A})^{-1}\overline{A}^T$ and apply it to the first estimates provided by the first power estimating modules $300_1$, $300_2$, $300_3$ and by the second power estimating module 301 to find the vector $\overline{X}$ solving the minimization problem [15].

According to a second embodiment of the present invention, the minimization problem to be solved for providing the second estimates involves an error vector $\overline{e}^*$ which is defined as follows:

$$\overline{e}^* = \overline{V}\overline{e} \quad [18]$$

where $\overline{V}$ is a diagonal matrix comprising a number 2N+1 of weights $V_1, V_2, \ldots, V_{2N+1}$. Accordingly, the minimization problem which is solved according to this embodiment is the following:

$$\min_{\overline{x}} |\overline{e}^*|^2 = \min_{\overline{x}} |\overline{V}(\overline{A}\overline{X} - \overline{Y})|^2. \quad [15]$$

According to this embodiment, each error term of vector [18] is preferably weighted with a weight $V_i$, $i=1, \ldots, 2N+1$.

Using weights allows to weight differently the error terms associated with the equations of system [10]. In particular, using weights allows giving more relevance, within the minimization process, to equations involving more reliable measurements than equations involving measurement that may be affected by higher errors. Generally, the choice of a weight $V_i$ may be for instance performed on the basis of the estimated signal power in each equation: the signals whose estimated power is higher are more robust against noise and the estimation is more reliable. Therefore, the equation associated with one of these signals may be considered more relevant within the minimization process and it may be associated with a higher weight. For instance, since the estimation of a signal is less reliable when the signal power is low, weights can be chosen such that $[V_1, V_2, \ldots, V_{2N+1}] = [S_1', \ldots, S_N', I_1', \ldots, I_N', P_{tot}']$.

According to this embodiment of the present invention, the solution is given by vector $\overline{X} = [S_1, S_2, \ldots, S_N, N_0]'$ computed as follows:

$$\overline{X} = (\overline{A}^T \overline{W} \overline{A})^{-1} \overline{A}^T \overline{W} \overline{Y} \quad [20]$$

where:

$$\overline{W} = \overline{V}^T \overline{V}. \quad [21]$$

The formula [20] above may be found in "Numerical Linear Algebra for Applications in Statistics" by James E. Gentle, Springer, pages 166-167.

The estimate $SE_i$, $i=1, \ldots, N$ of the SINR for each communication link is then provided by applying equation [17] above.

According to this embodiment, it is possible to give more relevance to certain equations of the system [10] with respect to other equations, for the minimization problem. In particular, it is possible to give more relevance to equations involving accurate first estimates of the useful signal powers and/or the interference powers, and lower relevance to equations involving terms that are presumably affected by higher errors.

According to a third embodiment of the present invention, the system of equations [9] can be simplified as follows:

$$\begin{cases} S_i = S_i' + e_i & i = 1, \ldots, N \\ \sum_{j=1}^{N} S_j + N_0 = P_{tot}' + e_{2N+1} \end{cases} \quad [22]$$

In this case, the solution may be found by solving a linear system. Solving the linear system [22] also corresponds to solving the minimization problem [19] according to the second embodiment of this invention, wherein the weights are selected such that $V_{N+1} = V_{N+2} = \ldots = V_{2N} = 0$.

Advantageously, the method according to the present invention allows estimating the SINR on a given communication link served by a base station by taking into consideration the power received as useful signals on the other communication links served by the same base station. Indeed, as described above, the estimate of the SINR on a communication link depends on the estimates of the useful signal power on the other links. This allows providing a more accurate estimate of the SINR than known methods as the method of WO 02/087106 A1.

The inventors performed a multilink simulation considering 3 HSUPA users connected to one base station. The first user transmits at a power level $P_1$ that is ten times higher than the power level $P_2$ and $P_3$ of the other users, namely $P_1 = 10 P_2 = 10 P_3$. Moreover, a noise source is considered with a power level $N_0$ ten times below the overall power of the three users, namely $N_0 = \frac{1}{10}(P_1 + P_2 + P_3)$. Block fading is considered also, so that the actual SINR level of the various transmissions varies with time. The simulation performed by the inventors provides estimations of the SINR levels of the users obtained with a known method such as the method of WO 02/087106 A1 (equation [8]) and the methods according to the different embodiments of the present invention. According to the first embodiment of the present invention, in this exemplary situation, the SINR estimate is provided by solving the minimization problem [15] with the LLS method. According to the second embodiment, the SINR estimate is provided by solving the weighted minimization problem [19] with the LLS method. According to the third embodiment, the SINR estimate is provided by solving the linear system [22].

In particular, a SINR error is computed as an average difference between the actual SINR level and the SINR level estimated by simulation, for the different users. The simulated SINR level and the actual SINR lever are averaged over time: for instance, a transmission of 10 seconds is considered and different estimates are taken at intervals of 2 ms (one estimate per block). Then, the SINR error is computed as the average of the SINR errors over time. According to the inventors' simulation, the known method of WO 02/087106 A1 provides an error equal to 3.93 dB for the first user, which transmits at a high power. In this case, the method according to the first embodiment of the present invention allows improving the estimate provided by the known method as it achieves an SINR error of 3.42 dB. The error is further reduced to 1.16 dB and 1.22 dB by applying the method according to the second embodiment and the third embodiment of the present invention, respectively.

For low power users (namely, the second and third users of the simulated example), the known method of WO 02/087106 A1 provides a SINR error of 1.06 dB and 1.11 dB for the second user and the third user, respectively. This error can be improved by the method of the present invention. In particular, application of the method according to the third embodiment allows achieving a SINR error of 0.96 dB and 0.98 dB for the second user and the third user, respectively.

It can be derived from the above results that the method according to the present invention allows improving the accuracy of SINR estimation as performed by known methods, such as the method of WO 02/087106 A1. In particular, the method of the present invention allows improving the accuracy of the SINR estimation in situations wherein the SINR is high, as described above with reference to the first user of the simulated example. However, the method according to the present invention allows achieving an improved accuracy also in cases where users transmit at low power and interference becomes significant, as described above with reference to the second user and the third user of the simulated example. In this latter case, as shown above, the more accurate SINR estimation is achieved by solving the system [22], which means considering only the useful signal power estimates and not the interference power estimates.

It is to be noticed that the method according to the present invention can be applied to implement a power control scheme, as described above with reference to FIG. 2. Moreover, it can be applied also for improving the accuracy of SINR estimation for implementing other schemes. For instance, it may be applied for improving the accuracy of SINR estimation for adaptive modulation and coding (AMC) schemes. In this case, application of the method according to the present invention may be used for driving in an efficient manner the selection of the modulation and coding scheme used for transmission. Moreover, it may be used in a successive interference cancellation (SIC) scheme, according to which usually the signals received over different links at a base station are ordered in decreasing order of SINR, so that the signal from the most reliable link (namely, with higher SINR) is decoded first, and then cancelled out from the overall received signal in order to provide a better reception of the signal from the second link, which is then cancelled out from the overall received signal in order to provide a better reception of the signal from the third link, and so on.

The invention claimed is:

1. A method for estimating a signal to interference and noise ratio of a communication link between a first node and a second node of a wireless communication network, said network comprising a number of further communication links between said first node and a number of further nodes of the wireless communication network, the method comprising, at said first node:
   providing a first estimate of each of useful signal powers ($S_1'$), ($S_2'$), ($S_3'$) on said communication link and on said further communication links;
   providing a second estimate of each of the useful signal powers on said communication link and on said further communication links on the basis of, jointly, the first estimate of the useful signal power ($S_1'$) on said communication link and the first estimates of the useful signal powers ($S_2'$), ($S_3'$) on said further communication links; and
   estimating said signal to interference and noise ratio as a ratio between the second estimate of the useful signal power on said communication link and a power term comprising a sum of the second estimates of each of the useful signal powers on the further communication links.

2. The method according to claim 1, wherein said providing a second estimate of the useful signal power on said communication link comprises providing a minimum square error comprising a first error between said second estimate of the useful signal power on said communication link and said first estimate of the useful signal power ($S_1'$) on said communication link.

3. The method according to claim 2, wherein said minimum square error comprises a second error between a first estimate of an interference power on the communication link and said power term comprising a sum of the second estimates of the useful signal powers on the further communication links.

4. The method according to claim 3, wherein said minimum square error comprises a third error between an estimate of an overall power received by said first node on said communication link and said further communication links and an even further power term comprising a sum of the second estimate of the useful signal power on the communication link and the second estimates of the useful signal powers on said further communication links.

5. The method according to claim 4, wherein each of said first error, second error and third error is weighted by a respective weight.

6. The method according to claim 5, wherein the weight for said first error is equal to the first estimate of the useful signal power ($S_1'$) on the communication link, the weight for said second error is equal to the first estimate of the interference power on the communication link and the weight for said third error is equal to said estimate of the overall power.

7. The method according to claim 2, wherein said providing a minimum square error is performed by applying a linear least square method.

8. The method according to claim 3, wherein said power term in said second error is scaled by a scale factor.

9. The method according to claim 8, wherein said scale factor is a spreading factor of an UMTS receiver or a processing gain of an LTE receiver.

10. The method according to claim 1, wherein said power term comprises an estimate of a noise power plus residual interference comprising thermal noise.

11. The method according to claim 1, wherein said first estimate of the useful signal power ($S_1'$) on said communication link and said first estimates of the useful signal powers ($S_2'$, $S_3'$) on said further communication links are provided by applying a SIR estimation method with narrowband interference estimate.

12. A non-transitory computer-readable recording medium that contains executable instructions, which when executable by a computer cause the computer to execute a method for estimating a signal to interference and noise ratio of a communication link between a first node and a second node of a wireless communication network, said network comprising a number of further communication links between said first node and a number of further nodes of the wireless communication network, the method comprising, at said first node:
   providing a first estimate of each of useful signal powers ($S_1'$), ($S_2'$, ($S_3'$) on said communication link and on said further communication links;
   providing a second estimate of each of the useful signal powers on said communication link and on said further communication links on the basis of, jointly, the first estimate of the useful signal power ($S_1'$) on said communication link and the first estimates of the useful signal powers ($S_2'$), ($S_3'$) on said further communication links; and
   estimating said signal to interference and noise ratio as a ratio between the second estimate of the useful signal power on said communication link and a power term comprising a sum of the second estimates of the useful signal powers on the further communication links.

13. A device for estimating a signal to interference and noise ratio of a communication link between a first node and a second node of a wireless communication network, said network comprising a number of further communication links between said first node and a number of further nodes of the wireless communication network, the device comprising:
- a number of power estimating modules configured to provide a first estimate of each of useful signal powers ($S_1'$), ($S_2'$), ($S_3'$) on said communication link and on said further communication links; and
- a computing module configured to provide a second estimate of each of the useful signal powers on said communication link and on said further communication links on the basis of, jointly, the first estimate of the useful signal power on said communication link ($S_1'$) and the first estimates of the useful signal powers on said further communication links ($S_2'$), ($S_3'$), and to estimate said signal to interference and noise ratio as a ratio between said second estimate of the useful signal power on said communication link and a power term comprising a sum of the second estimates of the useful signal powers on the further communication links.

14. A power control unit for a receiver of a node of a wireless communication network comprising a device for estimating a signal to interference and noise ratio according to claim 13.

15. A receiver for a node of a wireless communication network comprising a device for estimating a signal to interference and noise ratio according to claim 13.

* * * * *